US009020559B2

(12) United States Patent
Lehr et al.

(10) Patent No.: US 9,020,559 B2
(45) Date of Patent: Apr. 28, 2015

(54) METHOD AND CONTROL UNIT FOR DIRECT SAMPLING OF A PLURALITY OF RADIO BANDS

(75) Inventors: Carsten Lehr, Hannover (DE); Detlev Nyenhuis, Sibbesse (DE); Marcus Risse, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 142 days.

(21) Appl. No.: 13/376,142

(22) PCT Filed: Aug. 3, 2010

(86) PCT No.: PCT/EP2010/061281
§ 371 (c)(1),
(2), (4) Date: Feb. 16, 2012

(87) PCT Pub. No.: WO2011/023496
PCT Pub. Date: Mar. 3, 2011

(65) Prior Publication Data
US 2012/0140859 A1 Jun. 7, 2012

(30) Foreign Application Priority Data

Aug. 27, 2009 (DE) .......................... 10 2009 028 919

(51) Int. Cl.
*H04B 7/00* (2006.01)
*H04B 1/00* (2006.01)
*H04H 40/27* (2008.01)

(52) U.S. Cl.
CPC ............. *H04B 1/0064* (2013.01); *H04H 40/27* (2013.01); *H04H 2201/11* (2013.01); *H04H 2201/12* (2013.01); *H04H 2201/20* (2013.01)

(58) Field of Classification Search
CPC ............. H04B 1/0064; H04H 2201/11; H04H 2201/12

USPC .............. 455/20, 22, 130, 131, 168.1, 179.1, 455/190.2, 188.1, 272, 526, 550.1, 552.1, 455/323
See application file for complete search history.

(56) References Cited

U.S. PATENT DOCUMENTS

| 2002/0109635 | A1* | 8/2002 | Geeraert ....................... 343/702 |
| 2005/0008098 | A1† | 1/2005 | Iancu et al. |
| 2008/0096508 | A1* | 4/2008 | Luff ............................. 455/209 |
| 2008/0248770 | A1* | 10/2008 | Schultz et al. ............. 455/188.1 |

FOREIGN PATENT DOCUMENTS

| CN | 1318957 | 10/2001 |
| DE | 19838244 | † 2/2000 |

(Continued)

OTHER PUBLICATIONS

International Search Report, PCT International Application No. PCT/EP2010/061281, dated Jan. 26, 2011.†

*Primary Examiner* — Tuan Pham
(74) *Attorney, Agent, or Firm* — Kenyon & Kenyon LLP

(57) ABSTRACT

A method for direct sampling of a plurality of radio bands, including a step of receiving a first radio band via a first interface and at least one additional radio band via at least one additional interface, the first radio band and the at least one additional radio band each being associated with different frequency ranges, and the first radio band or the at least one additional radio band being a DAB band. Furthermore, a selection signal is received via an interface, the selection signal indicating whether further processing of the first radio band and/or the at least one additional radio band takes place. Depending on the selection signal, the first radio band is sampled at a common sampling frequency and/or the at least one additional radio band is sampled at the common sampling frequency.

19 Claims, 2 Drawing Sheets

(56) References Cited

FOREIGN PATENT DOCUMENTS

| | | | |
|---|---|---|---|
| EP | 0896425 | † | 2/1999 |
| RU | 2 134 016 | | 7/1999 |
| TW | 200625856 | † | 9/2005 |
| WO | WO 2006087506 | † | 8/2006 |

\* cited by examiner
† cited by third party

METHOD AND CONTROL UNIT FOR DIRECT SAMPLING OF A PLURALITY OF RADIO BANDS

FIELD OF THE INVENTION

The present invention relates to a method for, direct sampling of a plurality of radio bands, a method for determining a common sampling frequency, a control unit, and a computer program product.

BACKGROUND INFORMATION

DAB (Digital Audio Broadcasting) is a digital transmission standard in particular for radio programs. The term DAB is used below as an umbrella term for DAB, DAB+ and DMB (Digital Media Broadcasting).

Current DAB, FM and AM radio receivers have tuner modules (receiver modules) in which the HF signals (high-frequency signals) coming from the antenna are filtered, amplified and mixed to obtain a suitable intermediate frequency. In some receiver systems, the signals are then digitized using A/D converters (analog-digital converters) and are digitally demodulated. Separate tuner modules for DAB and FM/AM are used for this purpose.

One disadvantage of this is that the bandwidth of the signal is greatly reduced for both FM/AM and DAB before digitizing the bandwidth of the signal, so that for receiving two or more signals, each of which may correspond to one transmitter, a complete receiver path including a tuner module and an A/D converter is necessary for each signal to be received.

In high-end mobile receiver systems, two or more receiver paths for FM/AM are often needed to implement functions such as improving reception through diversity algorithms, background receivers for RDS (Radio Data System) reception, monitoring TMC (Traffic Message Channel) transmitters, etc. In addition, one or more receiver paths are needed for DAB to implement, for example, DAB reception improvement (e.g., diversity) and background tuners for a transmitter list, for example.

In recent system proposals, it is provided that the entire AM band or the entire FM band is digitized with the aid of a broadband A/D converter to have the entire band in digital form. Any number of channels may then be demodulated in a digital signal processing unit, as a function of the available computation power.

SUMMARY

An example method for direct sampling of a plurality of different radio bands, an example method for determining a common sampling frequency and an example control unit which uses these methods plus finally a corresponding computer program product are provided. Advantageous embodiments are described below.

According to an example embodiment of the present invention, the method of direct sampling may be expanded to DAB reception. Thus DAB/FM/AM receivers and in particular DAB/FM/AM radio receivers with direct sampling may be created. For this purpose, the determination of a sampling frequency which may be used for the DAB band as well as for the FM band and the AM band is proposed.

The reception path for systems with which DAB and FM/AM are receivable may be advantageously simplified significantly in this way.

An example embodiment of the present invention provides for direct sampling of a plurality of radio bands including the following steps: receiving a first radio band via a first interface and at least one additional radio band via at least one additional interface, the first radio band and the at least one additional radio band being each assigned to different frequency ranges and the first radio band or the at least one additional radio band being a DAB band; receiving a selection signal via an interface, the selection signal indicating whether further processing of the first radio band and/or of the at least one additional radio band is provided; and sampling the first radio band using a common sampling frequency and/or the at least one additional radio band using the common sampling frequency, depending on the selection signal.

The method according to the present invention may be carried out, for example, by a receiving section of a radio receiver which is designed to receive stations or programs transmitted via a transmission path on a plurality of radio bands. The plurality of radio bands may be high-frequency signals, via which an information signal, for example, a radio program, is transmitted. Each of the radio bands may have its own frequency range. The frequency ranges of the radio bands may be spaced a distance apart from one another. The DAB band may be transmitted on a frequency between 174.928 MHz and 239.2 MHz. The frequencies of the other radio bands may be lower than those of the DAB band. For example, the other radio bands may include an AM band having a frequency between 153 kHz and 26.1 MHz and/or an FM band having a frequency between 87.5 MHz and 108 MHz. The first and the at least one additional interface may be interfaces to antennas or preliminary stages, which are adapted to the corresponding radio bands. The radio bands may be received via the corresponding interfaces at the same time. For example, three different radio bands may be received at the same time. The selection signal may be supplied by a user, for example, in that the user selects one of the radio bands. The selection signal may also be supplied by a system to obtain required information which is transmitted via a certain radio band. Controlled by the selection signal, for example, a selector switch may be controlled via which the plurality of radio bands may be sent to a sampling device. The sampling device may be designed to sample the radio band selectable via the selection signal at the common sampling frequency. The common sampling frequency may be predetermined and set permanently. The common sampling frequency defines a corresponding common sampling rate. Each of the plurality of radio bands may thus be sampled at one and the same common sampling frequency and sampling rate. The sampling device may be designed to sample two or more radio bands at the same time. In this case the selection signal may be designed to select a corresponding number of radio bands to enable their sampling and further processing.

The first radio band may represent a signal which is supplied by a first preliminary stage adapted to the first radio band. According to this the at least one additional radio band may represent a signal which is supplied by at least one additional preliminary stage adapted to the at least one additional radio band. Thus, a separate preliminary stage may be assigned to each radio band.

Furthermore, the first and the at least one additional radio band signals may represent signals supplied by at least one antenna adapted to the corresponding radio band. Thus, for each radio band, a separate antenna may be provided or a shared antenna may be used jointly for two or more radio bands. The shared antenna may be adapted to multiple radio bands so that a separate antenna is not needed for each band but a separate preliminary stage is used.

The method according to the present invention may include a step of supplying a first sampled radio band or a second sampled radio band to an interface. The interface may represent an interface to a digital signal processing device. In this way, the different radio bands may be processed further by one and the same signal processing [unit] after being sampled.

Furthermore, the radio bands may also include an AM band and/or an FM band. The example method according to the present invention may thus be used advantageously in a DAB, FM, [or] AM radio receiver.

Therefore the different frequency ranges may include, for example, a frequency range between 100 kHz and 50 MHz and/or a frequency range between 50 MHz and 150 MHz and a frequency range between 150 MHz and 250 MHz. In particular, frequency ranges between 153 kHz and 26.1 MHz, 87.5 MHz and 108 MHz and between 174.928 MHz and 239.2 MHz are also possible. Alternatively, any other frequency ranges are also possible, so that the method may be adapted to radio frequencies used in different countries, for example.

The common sampling frequency may be determined according to another method according to the present invention for determining a common sampling frequency. The common sampling frequency may be determined separately and supplied to a device which is designed to execute the method for direct sampling of the plurality of radio bands. Alternatively, the common sampling frequency may be determined directly by the device which is designed to execute the method for direct sampling of the plurality of radio bands.

The present invention thus also provides an example method for determining a common sampling frequency for direct sampling of a plurality of radio bands, including the following steps: ascertaining a first Nyquist band with respect to a first radio band and at least one additional Nyquist band with respect to at least one additional radio band; and determining the common sampling frequency as a frequency which is situated in both the first Nyquist band and the at least one additional Nyquist band. The frequencies included by the individual Nyquist bands may each be suitable for sampling the assigned radio band. According to the Nyquist criterion, sub-samplings may also be provided.

Accordingly, the first Nyquist band and the at least one additional Nyquist band may be of different orders. A higher order may result in a stronger sub-sampling. In this way the sub-sampling may be chosen to be greater in the case of radio bands having higher frequencies than in the case of radio bands having lower frequencies. This makes it possible to find a common sampling frequency for radio bands even if the frequencies of the radio bands differ by several powers of ten.

The common sampling frequency may be determined as a frequency which has a preferably great distance from the band limits of the first Nyquist band and of the at least one additional Nyquist band. Therefore corresponding band filters may be implemented in HF preliminary stages as easily as possible. The common sampling frequency may also be determined as a frequency which is a multiple of an ideal sampling frequency of the first radio band or of the at least one additional radio band. This may lead to a further simplification of the overall system.

The present invention also provides an example control unit which is designed to perform, i.e., to implement the steps of the example method according to the present invention. Through this embodiment variant of the present invention in the form of a control unit, the object of the present invention may be solved rapidly and efficiently.

In the present case, a control unit may be understood to be an electrical device which processes the sensor signals and outputs control signals as a function thereof. The control unit may have an interface, which may be embodied in hardware and/or software. In a hardware embodiment, the interfaces may be part of a so-called system ASIC, for example, which includes, a wide variety of functions of the control unit. However, it is also possible for the interfaces to be their own integrated circuits or to at least partially be made up of discrete components. In a software embodiment, the interfaces may be software modules which are present, for example, on a microcontroller or DSP in addition to other software modules. In conjunction with the present invention, the control unit may be a radio receiver or part of a radio receiver, in particular a receiving section.

A computer program product having program code which is stored on a machine-readable carrier such as a semiconductor memory, a hard drive memory or an optical memory and is used for performing the example method according to one of the specific embodiments described above when the program is executed on a control unit is also advantageous.

BRIEF DESCRIPTION OF THE DRAWINGS

The present invention is explained in greater detail below on the basis of the figures.

DETAILED DESCRIPTION OF EXAMPLE EMBODIMENTS

Figure 1:
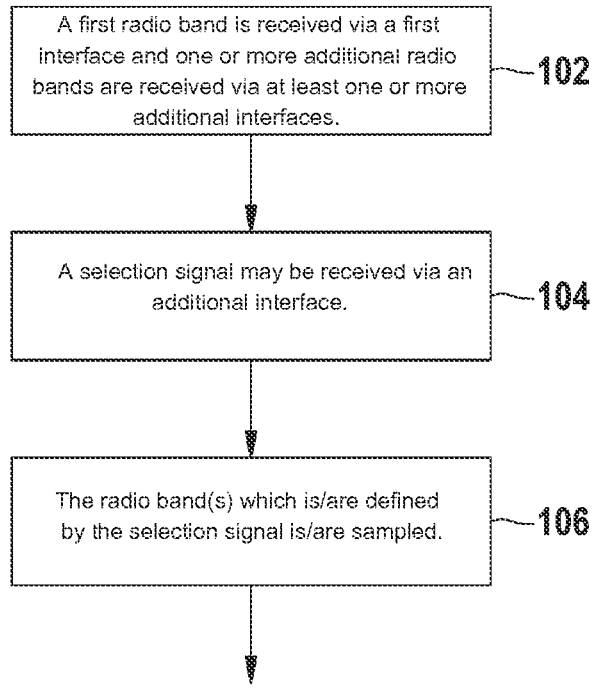
FIG. 1 shows a flow chart of an example method according to the present invention for direct sampling of a plurality of radio bands.

In the following description of preferred exemplary embodiments of the present invention, the same or similar reference numerals are used for the elements which are shown in the various figures and have similar effects, so that a repeated description of these elements is omitted.

FIG. 1 shows a flow chart of a method according to the present invention for direct sampling of a plurality of radio bands according to an exemplary embodiment of the present invention.

In a first step, a first radio band is received 102 via a first interface and one or more additional radio bands are received via at least one or more additional interfaces. For example, a first radio band may be received via a first interface, a second radio band may be received via a second interface and a third radio band may be received via a third interface. According to this exemplary embodiment, the radio bands have different frequency ranges. In another step a selection signal may be received 104 via an additional interface. The selection signal may define which of the received radio bands is to be sampled for further signal processing. The selection signal may be performed after, simultaneously with or before reception 102 of the radio bands. If only one radio signal is always sampled at the same time, the selection signal may select only one single radio band. However if two or more radio signals may be sampled at the same time, the selection signal may select a corresponding number of radio bands which may be sampled in parallel. In another step the radio band(s) which is/are defined by the selection signal is/are sampled 106. Sampling 106 is performed for each selectable radio band using the same sampling frequency. If a modified selection signal is received during sampling 106, sampling may be continued with a radio band modified according to the selection signal.

Figure 2:
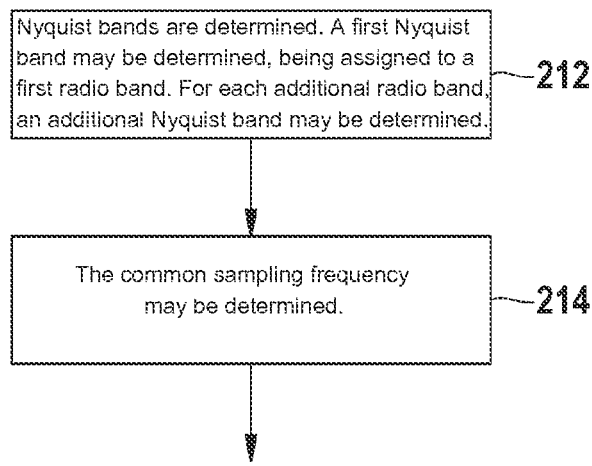
FIG. 2 shows a flow chart of an example method according to the present invention for determining a common sampling frequency.

FIG. 2 shows a flow chart of a method according to the present invention for determining a common sampling frequency for direct sampling of a plurality of radio bands according to one exemplary embodiment of the present invention.

In one step of ascertaining 212, a first Nyquist band may be determined, this band being assigned to a first radio band to be received or already received. The first Nyquist band may be determined according to a Nyquist condition which is assigned to the first radio band. Furthermore, for each additional radio band, to be received or already received an additional Nyquist band may be determined. This may be based on a Nyquist condition assigned to the corresponding radio band accordingly. The Nyquist conditions may differ in that they have different orders, for example. After determining the Nyquist bands, the common sampling frequency may be determined 214. The common sampling frequency may be determined as a frequency which is contained in each of the Nyquist bands ascertained. This may be done using a suitable selection or comparison algorithm. A plurality of possible common sampling frequencies may typically be ascertained from the quantity of Nyquist bands. If a plurality of possible common sampling frequencies is available for selection, one of the possible frequencies may be selected as the common sampling frequency. This may take place according to predetermined selection criteria. This one common sampling frequency may then be used for sampling the plurality of radio bands.

Figure 3:
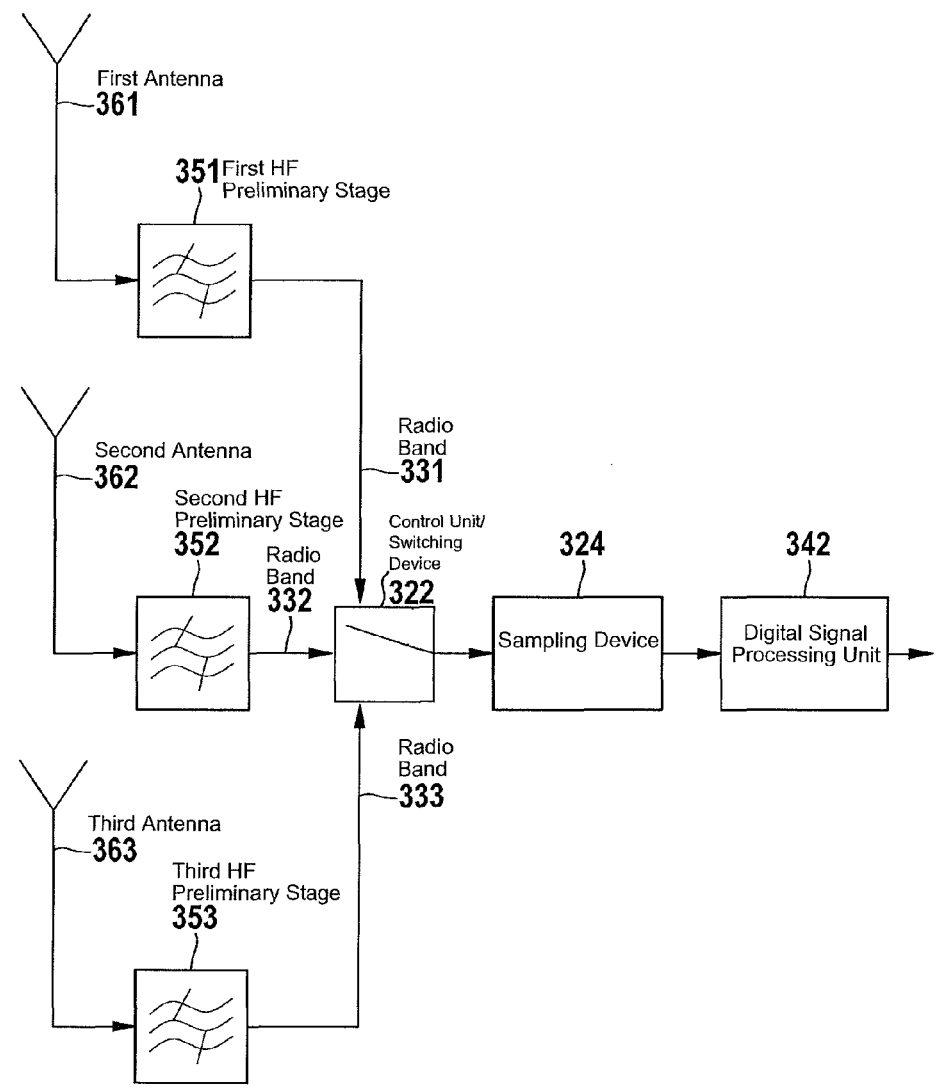
FIG. 3 shows a block diagram of an exemplary embodiment of the present invention.

FIG. 3 shows a block diagram of a receiving device according to one exemplary embodiment of the present invention. The receiving device may be designed to implement the method according to the present invention for direct sampling of a plurality of radio bands. For this purpose, the receiving device may have a corresponding control unit.

The receiving device has a control unit, in this embodiment, containing switching device 322 and a sampling device 324. Switching device 322 has one or more interfaces to receive a plurality of radio bands 331, 332, 333. Switching device 322 is designed to select one of radio bands 331, 332, 333 and supply it to the sampling device 324. Switching device 322 may therefore be designed to receive a selection signal, which is able to define the radio band to be relayed to sampling device 324 via switching device 322. Sampling device 324 is designed to receive the relayed radio band from switching device 322 and to sample it at a common sampling frequency. Sampling device 324 may be designed to receive or generate a corresponding sampling signal having the common sampling frequency. Sampling device 324 may be designed to supply a sampled radio band. Sampling device 324 may be embodied as an analog-digital converter (ADC).

The sampled radio band may be received and processed further by a unit for digital signal processing 342. Digital signal processing [unit] 342 may be designed to output a further processed radio band. The unit for signal processing 342 may be embodied as a digital signal processor (DSP).

The control unit, in this embodiment containing switching device 322 may be designed to receive radio bands 331, 332, 333 from one or a plurality of receiving devices. According to this exemplary embodiment, switching device 322 is designed to receive first radio band 331 from a first HF preliminary stage 351, second radio band 332 from a second HF preliminary stage 352, and third radio band 333 from a third HF preliminary stage 353.

According to this exemplary embodiment, the receiving device has a first antenna 361, a second antenna 362 and a third antenna 363. First antenna 361 is designed to receive a first high-frequency signal and to supply it to first HF preliminary stage 351. Second antenna 362 is designed to receive a second high-frequency signal and to supply it to second HF preliminary stage 352. Third antenna 363 is designed to receive a third high-frequency signal and to supply it to third HF preliminary stage 353. According to this exemplary embodiment, first antenna 361 is designed to receive an AM radio signal, second antenna 362 is designed to receive an FM radio signal and third antenna 363 is designed to receive a DAB band III radio signal. Accordingly, first HF preliminary stage 351 may be an AM preliminary stage, second HF preliminary stage 352 may be an FM preliminary stage and third HF preliminary stage 353 may be a DAB band III preliminary stage. The type and number of the received signals and thus the type and number of the signal paths have been selected only as examples and may be adjusted. For example, a combination antenna for two or more reception bands may be used simultaneously.

On the basis of the device shown in FIG. 3, a system in which the FM band, the AM band and the DAB band III may be digitized with the aid of one or more A/D converters is described. To obtain a simple design, it is advantageous to be able to operate the A/D converter(s) for all three bands at the same sampling frequency. The choice of the sampling frequency according to the present invention which is suitable for such systems is described below.

To this end, FIG. 3 shows as an example a system for direct sampling of FM band 331, AM band 332 and DAB band III 333. For three bands 331, 332, 333, the system includes one antenna each 361, 362, 363 and one HF preliminary stage 351, 352, 353, which may be a band filter, possibly an amplifier or possibly an automatic gain control (AGC). Instead of different antennas for each reception band, one antenna may be used simultaneously for two or more reception bands. A selector switch 322 is followed by an A/D converter 324 and a digital signal processing unit 342, shown here as a DSP, for example. Depending on the switch position of selector switch 322, A/D converter 324 converts FM band 331, AM band 332 or DAB band III 333. In the following digital signal processing unit 342, any number of channels of received bands 331, 332, 333 may then be demodulated, depending on the available computation power. Alternatively, it is also possible to provide two or more A/D converters 324 in order to be able to convert and demodulate two or more bands 331, 332, 333 at the same time. In this case, two A/D converters 324, for example, may be situated in parallel and one or two selector switches 322 may relay two selected bands of bands 331, 332, 333 to the two A/D converters for sampling.

To obtain a simple design, it is advantageous to operate A/D converter(s) 324 for all three bands 331, 332, 333 at the same sampling frequency.

According to the present invention, this may be accomplished using the following choice of sampling frequencies. The band limits are given here for Europe as an example.

For the AM band (f_AM_min=153 kHz to f_AM_max=26.1 MHz) the first Nyquist band is determined:

$$f\_sample > 2 * f\_AM\_max \qquad \text{(first Nyquist band)}$$

For the FM band (f_FM_min=87.5 MHz to f_FM_max=108 MHz), the second Nyquist band is determined:

$$2 * f\_FM\_min > f\_sample > f\_FM\_max \qquad \text{(second Nyquist band)}$$

For DAB band III (f_DAB_min=174.928 MHz to f_DAB_max=239.2 MHz), the third Nyquist band is determined:

$$f\_DAB\_min > f\_sample > 2 * f\_DAB\_max/3 \qquad \text{(third Nyquist band)}$$

Bands 331, 332, 333 are thus sampled according to the Nyquist criterion, according to which it holds that:

$$(2*f\_min)/(n-1) > f\_sample > 2*f\_max/n$$

For AM band 331, n is 1, for FM band 332, n is 2 and for DAB band 333, n is 3. Thus Nyquist bands of different orders are used.

When summarized for all three bands 331, 332, 333 this yields:

Condition 1:
min(2*f_FM_min, f_DAB_min>f_sample>max(f_AM_max, f_FM_max, 2*f_DAB_max/3), i.e., min (175 MHz, 174.928 MHz)>f_sample>max(26.1 MHz, 108 MHz, 159.467 MHz).

The choice of the sampling frequency may advantageously be made so as to yield for all bands the greatest possible difference between the upper and lower band limits and the limits of the corresponding Nyquist bands determined by the sampling frequency. In this way, the band filters in HF preliminary stages 351, 352, 353 may be implemented in the simplest possible way.

This yields the following additional conditions:
Condition 2:
For the AM band, (f_sample/2−f_AM_max) should be as large as possible.
Condition 3:
For the FM band, (f_sample−f_FM_max) should be as large as possible and (f_FM_min−f_sample/2) should be as large as possible. In the ideal case, this is:

$$f\_sample - f\_FM\_max = f\_FM\_min - f\_sample/2$$

It follows from this that:

$$f\_sample = 2/3 * (f\_FM\_max + f\_FM\_min)$$

$$f\_sample = 2/3 * (87.5 \text{ MHz} + 108 \text{ MHz}) = 130.33 \text{ MHz}$$

because according to condition 1, f_sample 159.467 MHz must hold, so it follows that for optimization for the FM band should be selected to be as small as possible within the context of condition 1, i.e., f_sample−159.467 MHz.

Condition 4:
For DAB band III (3*f_sample/2−f_DAB_max) should be as large as possible and (f_DAB_min−f_sample) should be as large as possible. In the ideal case this is:

$$3*f\_sample/2 - f\_DAB\_max = f\_DAB\_min - f\_sample.$$

It follows from this that:

$$f\_sample = 2/5 * (f\_DAB\_max + f\_DAB\_min)$$

$$f\_sample = 2/5 * (174.928 \text{ MHz} + 239.2 \text{ MHz}) = 165.6512 \text{ MHz}.$$

There is thus a compromise among the four conditions for the optimal range of the sampling frequency:

$$159.467 \text{ MHz} \leq f\_sample \leq \text{approximately } 165.6512 \text{ MHz}.$$

Another simplification of the overall system is achieved by selecting the sampling rate in such a way that for the following digital signal processing unit a preferably simple reduction in the sampling rate to a rate suitable for demodulation results.

Although AM and FM demodulations depend less on a certain sampling frequency, DAB modulation depends on a sampling rate of 2.048 MHz.

This yields as an advantageous sampling rate: approximately 165.6512 MHz≥f_sample=N*2.048 MHz≥159.467.

Under the aforementioned conditions, either $$f\_sample = 81 * 2.048 \text{ MHz} = 165.888 \text{ MHz}$$

or $$f\_sample = 80 * 2.048 \text{ MHz} = 163.84 \text{ MHz}$$

is optimal because in addition to the optimization of the distance of the reception ranges from the band limits, this yields very simple decimations by the factor $3^4 = 81$ or $2^4 * 5 = 80$ for the DAB band.

The present invention described here may be used in general on systems in which the reception of DAB in band III is combined with the reception of services in the FM band and/or the AM band. This is the case, for example, with HD radio reception in the FM and/or the AM band, DRM reception in the AM band or DRM+ reception in the FM band.

The approach according to the present invention permits an equipment design in which the tuner modules are replaced by one or more broadband converters. The present invention may be used, for example, in future generations of radio receivers.

The exemplary embodiments described here and illustrated in the figures are selected only as examples. Different exemplary embodiments may be combined with one another completely or with respect to individual features. An exemplary embodiment may also be supplemented by features of another exemplary embodiment.

Furthermore, method steps according to the present invention may be executed repeatedly and in a different order than that described here.

If an exemplary embodiment includes an "and/or" linkage between a first feature and a second feature, this may be interpreted as meaning that the exemplary embodiment according to one specific embodiment has both the first feature and the second feature and according to another specific embodiment has either only the first feature or only the second feature.

What is claimed is:

1. A method for direct sampling of a plurality of radio bands, comprising:
    receiving a first radio band via a first interface and at least one additional radio band via at least one additional interface, the first radio band and the at least one additional radio band each being assigned to different frequency ranges, one of the first radio band or the at least one additional radio band being a DAB band;
    receiving a selection signal via an interface, the selection signal indicating whether further processing of at least one of the first radio band and the at least one additional radio band is provided; and
    sampling at least one of the first radio band at a common sampling frequency, and the at least one additional radio band at the common sampling frequency depending on the selection signal,
    wherein the common sampling frequency is determined according to a method for determining a common sampling frequency, the method for determining including:
        ascertaining a first Nyquist band with respect to the first radio band and at least one additional Nyquist band with respect to the at least one additional radio band, and
        determining the common sampling frequency as a frequency located in the first Nyquist band as well as in the at least one additional Nyquist band.

2. The method as recited in claim 1, wherein the first radio band represents a signal, which is supplied by a first preliminary stage adapted to the first radio band and in which the at least one additional radio band represents a signal which is supplied by at least one additional preliminary stage adapted to the at least one additional radio band.

3. The method as recited in claim 1, wherein the first and the at least one additional radio band represent signals which are supplied by at least one antenna adapted to the corresponding radio band.

4. The method as recited in claim 1, further comprising:
supplying a first sampled radio band or a second sampled radio band at an interface, the interface representing an interface to a digital signal processing unit.

5. The method as recited in claim 1, wherein the radio bands also include at least one of an AM band and an FM band.

6. The method as recited in claim 1, wherein the different frequency ranges include at least one of a frequency range between 100 kHz and 50 MHz, a frequency range between 50 MHz and 150 MHz, and a frequency range between 150 MHz and 250 MHz.

7. The method as recited in claim 1, wherein the selection signal controls a selection switch, the selection switch acting to select the at least one of the first radio band and the at least one additional radio band for sampling.

8. The method as recited in claim 1, wherein sampling the at least one of the first radio band at a common sampling frequency is performed at the same time as sampling the at least one additional radio band at the common sampling frequency depending on the selection signal.

9. A method for determining a common sampling frequency for direct sampling of a plurality of radio bands, comprising:
ascertaining a first Nyquist band with respect to a first radio band and at least one additional Nyquist band with respect to at least one additional radio band; and
determining the common sampling frequency as a frequency located in the first Nyquist band as well as in the at least one additional Nyquist band.

10. The method for determining a common sampling frequency as recited in claim 9, wherein the first Nyquist band and the at least one additional Nyquist band have different orders.

11. The method for determining a common sampling frequency as recited in claim 9, wherein the common sampling frequency is determined as a frequency having a great distance from band limits of the first Nyquist band and of the at least one additional Nyquist band.

12. The method for determining a common sampling frequency as recited in claim 9, wherein the common sampling frequency is determined as a frequency which is a multiple of an ideal sampling frequency of the first radio band or of the at least one additional radio band.

13. A control unit for direct sampling of a plurality of radio bands, the control unit configured to receive a first radio band via a first interface and at least one additional radio band via at least one additional interface, the first radio band and the at least one additional radio band each being assigned to different frequency ranges, one of the first radio band or the at least one additional radio band being a DAB band, the control unit further configured to receive a selection signal via an interface, the selection signal indicating whether further processing of at least one of the first radio band and the at least one additional radio band is provided, and sample at least one of the first radio band at a common sampling frequency and the at least one additional radio band at the common sampling frequency, depending on the selection signal, wherein the common sampling frequency is determined by:
ascertaining a first Nyquist band with respect to the first radio band and at least one additional Nyquist band with respect to the at least one additional radio band; and
determining the common sampling frequency as a frequency located in the first Nyquist band as well as in the at least one additional Nyquist band.

14. The control unit as recited in claim 13, further comprising:
a selection switch, controlled by the selection signal, selecting the at least one of the first radio band and the at least one additional radio band for sampling.

15. The control unit as recited in claim 13, wherein the control unit samples the at least one of the first radio band at the common sampling frequency and the at least one additional radio band at the common sampling frequency at the same time, depending on the selection signal.

16. The control unit as recited in claim 13, further comprising:
at least one antenna, adapted to a corresponding radio band, that supplies the first radio band and the at least one additional radio band.

17. The control unit as recited in claim 13, wherein the first Nyquist band and the at least one additional Nyquist band used to ascertain and determine the common sampling frequency have different orders.

18. The control unit as recited in claim 13, wherein the common sampling frequency is determined as a frequency which is a multiple of an ideal sampling frequency of the first radio band or of the at least one additional radio band.

19. A non-transitory computer-readable medium storing a computer program having program codes which, when executed by a control unit, perform a method, the method comprising:
receiving a first radio band via a first interface and at least one additional radio band via at least one additional interface, the first radio band and the at least one additional radio band each being assigned to different frequency ranges, one of the first radio band or the at least one additional radio band being a DAB band;
receiving a selection signal via an interface, the selection signal indicating whether further processing of at least one of the first radio band and the at least one additional radio band is provided; and
sampling at least one of the first radio band at a common sampling frequency, and the at least one additional radio band at the common sampling frequency depending on the selection signal,
wherein the common sampling frequency is determined by:
ascertaining a first Nyquist band with respect to the first radio band and at least one additional Nyquist band with respect to the at least one additional radio band; and
determining the common sampling frequency as a frequency located in the first Nyquist band as well as in the at least one additional Nyquist band.

* * * * *